United States Patent
Pardo (10) Patent No.: US 7,375,489 B2
(45) Date of Patent: May 20, 2008

(54) APPARATUS FOR GENERATING SINE WAVES OF ELECTROMOTIVE FORCE, ROTARY SWITCH USING THE APPARATUS, AND GENERATORS USING THE ROTARY SWITCH

(75) Inventor: Herbert Pardo, Davie, FL (US)

(73) Assignee: Differential Power LLC, Conyers, GA (US)

( * ) Notice: Subject to any disclaimer, the term of this patent is extended or adjusted under 35 U.S.C. 154(b) by 0 days.

(21) Appl. No.: 10/680,422

(22) Filed: Oct. 6, 2003

(65) Prior Publication Data

US 2007/0182274 A1 Aug. 9, 2007

Related U.S. Application Data

(60) Provisional application No. 60/416,890, filed on Oct. 7, 2002.

(51) Int. Cl.
*H02P 3/18* (2006.01)

(52) U.S. Cl. .................. 318/727; 318/138; 363/42; 363/43; 307/106

(58) Field of Classification Search .............. 318/470, 318/471, 139, 140, 727, 138; 323/299; 363/42, 363/43, 79, 65; 320/118; 307/106
See application file for complete search history.

(56) References Cited

U.S. PATENT DOCUMENTS

| | | | | |
|---|---|---|---|---|
| 1,691,986 A | * | 11/1928 | Nyquist | ................. 363/43 |
| 2,496,859 A | * | 2/1950 | Dalzell | ................. 320/124 |
| 2,646,478 A | | 7/1953 | Euler et al. | |
| 2,920,217 A | * | 1/1960 | House | ................. 307/106 |
| 3,100,851 A | * | 8/1963 | Ross et al. | ................. 307/107 |
| 3,125,652 A | | 3/1964 | Richert | |
| 3,215,860 A | | 11/1965 | Neumann | |
| 3,440,514 A | * | 4/1969 | Fenley | ................. 320/118 |
| 4,085,374 A | | 4/1978 | Nagahama | |
| 4,167,775 A | * | 9/1979 | Baker et al. | ................. 363/42 |
| 4,238,820 A | * | 12/1980 | Naaijer | ................. 363/43 |
| 4,259,652 A | | 3/1981 | Mattson | |
| 4,344,123 A | | 8/1982 | Bhagwat et al. | |
| 4,403,113 A | | 9/1983 | Ogita | |
| 4,404,430 A | | 9/1983 | Ogita | |
| 4,591,965 A | * | 5/1986 | Dickerson | ................. 363/43 |
| 4,670,662 A | * | 6/1987 | Goldstein et al. | ............ 307/106 |
| 4,680,690 A | * | 7/1987 | Dickerson | ................. 363/43 |
| 4,685,043 A | * | 8/1987 | Mehnert | ................. 363/43 |
| 4,996,637 A | * | 2/1991 | Piechnick | ................. 363/16 |
| 5,005,114 A | * | 4/1991 | Gleim | ................. 363/43 |

(Continued)

OTHER PUBLICATIONS

Brain, M.: "How Emergency Power Systems Work", HowStuffWorks, Inc., 1998-2003, 5 pages.

*Primary Examiner*—Paul Ip
(74) *Attorney, Agent, or Firm*—Woodcock Washburn LLP (57) ABSTRACT

An apparatus generates sine waves of electromotive force (i.e. alternating current) from a battery. The battery includes a given number of cells connected in series. A stator and commutator is formed by a multiple of segments. Each of the segments is connected in sequence to a respective cell of the battery. The apparatus can be incorporated in a rotary switching device that further includes a rotor having at least one brush contacting the segments of the stator and commutator to carry a step waveform approximating a sine wave. The rotary switch can be included in various setups to provide a backup or alternate generator that provides alternating current.

16 Claims, 9 Drawing Sheets

U.S. PATENT DOCUMENTS

| | | |
|---|---|---|
| 5,087,903 A | 2/1992 | Chiu |
| 5,241,288 A | 8/1993 | Aria |
| 5,548,259 A | 8/1996 | Ide et al. |
| 5,682,305 A * | 10/1997 | Kurokami et al. ............ 363/79 |
| 5,869,956 A * | 2/1999 | Nagao et al. ................ 323/299 |
| 5,923,158 A * | 7/1999 | Kurokami et al. .......... 323/299 |
| 7,046,531 B2 * | 5/2006 | Zocchi et al. ................. 363/65 |

* cited by examiner

APPARATUS FOR GENERATING SINE WAVES OF ELECTROMOTIVE FORCE, ROTARY SWITCH USING THE APPARATUS, AND GENERATORS USING THE ROTARY SWITCH

CROSS-REFERENCE TO RELATED APPLICATION

This application claims priority of provisional patent application 60/416,890, filed Oct. 7, 2002.

BACKGROUND OF THE INVENTION

1. Field of the Invention

The invention relates to alternating-current power generators working from batteries.

2. Description of the Related Art

Auxiliary power systems based on batteries provide backup electrical current when normal power is interrupted or unavailable. In his article, Marshall Brain broadly describes, "How Emergency Power Systems Work," How-StuffWorks, Inc. 1998. As described, batteries are the power source in one of the main types of backup power supplies. Batteries are charged with and produce direct current. In contrast, most public electrical utilities provide alternating current due to limitations of direct current. In addition, most appliances utilize alternating current.

To make the power from batteries usable by household appliances, inverters are used to convert direct current to alternating current. However, inverters are relatively expensive because they require semiconductors such as Insulated Gate Bipolar Transistors (IGBTs). Inverters utilizing semiconductors cannot be used with reactive loads because the reactive load will quickly burnout the semiconductor component. Furthermore, the semiconductors generally have a limited lifespan. The short lifespan, coupled with the expense, makes inverters impractical for extended use.

Like batteries, the power from alternators cannot be used to directly power household appliances. Alternators connected to an internal combustion engine produce pulsating direct current. Such direct current is suitable for charging a battery. However, pulsating direct current cannot be used to power appliances that are configured to run on alternating current.

Generators connected to internal combustion engines are not practical for producing alternating current for household appliances. Generators connected to internal combustion engines rely on fuel. In many applications where electrical utilities are unavailable, so is the fuel needed to power internal combustion engines. Furthermore, voltages output by the generator depend on the rpm of the motor. In addition, the efficiency of such generators is limited by the electromotive effect.

In U.S. Pat. No. 1,691,986 issued to Nyquist, an apparatus and a method for generating pure sine waves of electromotive force are disclosed. Nyquist teaches to connect a battery producing a single voltage to two "distributors", which are formed by a resistor system. The resistor system is formed by two potentiometer resistors, a respective one connected to each terminal of the battery. Then multiple taps, which are each resistors, connect at various points along the potentiometer resistor to a respective segment of a stator and commutator (i.e. "tributor ring"). A rotor can then be turned within the stator and commutator to produce an alternating sine wave. As shown in FIG. 2 of Nyquist, the resulting waveform has an uneven step-up; i.e. the height of each step near the baseline is shorter than a step near the apex of the wave. In addition, because the system utilizes resistors, the output voltage of the sine wave depends on the resistance of the load and the resistance of the circuit. As a result, the output voltage is variable.

SUMMARY OF THE INVENTION

It is accordingly an object of the invention to provide an apparatus for generating sine waves of electromotive force, a rotary switch using the apparatus, and generators using the rotary switch that overcome the hereinafore-mentioned disadvantages of the heretofore-known devices of this general type and that generate a sine wave with low and high power, for the purpose of supplying AC power, for all kinds of equipment that require single and three phase electrical power.

With the foregoing and other objects in view, there is provided, in accordance with the invention, an apparatus for generating sine waves of electromotive force. The apparatus includes a battery and a stator and commutator. The battery includes a given number of cells connected in series. The stator and commutator is formed by a multiple of segments, the multiple equaling the given number of cells 21 multiplied by a natural number (i.e. n=1, 2, 3 . . . ). For example, if there are twenty cells, there could be twenty, forty, sixty, etc. segments. Each of the segments is connected sequentially to a respective one of said cells. The reason for this is that the electric potential at each of the cells is affected by the neighboring cells. The midpoint of the battery cells has a zero-potential. The cells at one end of the ends have a positive potential that increases with distance from the midpoint. The cells at the other end have a negative potential that decreases (i.e. increasingly negative) with distance from the midpoint. The cells are then connected in sequence to segments of the wheel.

In cases where the number of segments is two or more times the number of cells, the segments are connected to the cells to create, in the stator and commutator, a potential having ascending positive voltages, descending positive voltages, descending negative voltages, and increasing negative voltages.

A rotary switch can be manufactured that includes the above-described apparatus. The rotor turns concentrically within the stator and commutator and has a brush that contacts the segments of the stator and commutator when the rotor turns. When manufacturing the brush, the brush must be built so as not to "stretch" under centrifugal force and wear the segments.

Various embodiments utilize different number of brushes on the rotor. If only one brush is used, a counterbalance should be included to offset the weight of the brush. If more than one brush is used, the brushes should be distributed equally about the rotor to maintain the rotational balance of the rotor. By distributing the brushes evenly, the resulting waveform is also symmetrical.

In accordance with a further object of the invention, the number of sets of segments and the number of brushes, and the rotational speed of the rotor can all be adjusted to change the resulting waveform. Generally, the number of segments and brushes will be chosen to limit the necessary speed of the motor to one that is physically feasible and commercially available.

In accordance with a further object of the invention, the brushes and segments can be numbered to produce multiple phased waveforms. For example, if three-phased output is desired, one set of segments and a rotor with three evenly spaced brushes can be used. The result will be an evenly spaced three-phase waveform.

To conduct, the signal received by each brush, a respective slip ring is connected to the brush. The slip ring is also connected to an output. The ground for the output is connected to the midpoint of the battery bank, where there is zero potential.

In accordance with a further object of the invention, an electric motor is connected to the axis of the rotor to start in rotation. Furthermore, a starter is connected to the motor. The starter and motor can be recharged from the rotary switch once it has started.

To produce a high-powered embodiment, several stators and commutators and respective rotors can be connected in parallel to the battery. The brushes of the rotors can be configured to produce complementary waveforms or be spaced to produce different phased waveforms. In such an embodiment, the multiple rotors can be placed on a single axel.

In accordance with a further object of the invention, the rotary switch described above can be used as a backup generator in a house that normally uses an electric utility to provide alternating current. In such cases, the electric utility connects to a transfer box, which in turn, connects to the house at a main breaker. If power from the electric utility is interrupted, the rotary switch powered by the batter operates and provides alternating current to the house. During normal operation of the electric utility, the electric utility recharges the battery bank.

Even in a house that uses alternating current but is not connected to an electric utility, a generator according to the in invention can be used to provide alternating current for the house. The rotary switch has its output connected to the fuse box of the house. To charge the battery of the rotary switch, a battery charger is connected to the battery. The battery charger can be any typical charger but in particular includes a solar panel and an alternator and an internal combustion engine.

Other features that are considered as characteristic for the invention are set forth in the appended claims.

Although the invention is illustrated and described herein as embodied in an apparatus for generating sine waves of electromotive force, a rotary switch using the apparatus, and generators using the rotary switch, it is, nevertheless, not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DETAILED DESCRIPTION OF THE PREFERRED EMBODIMENTS

Figure 14:
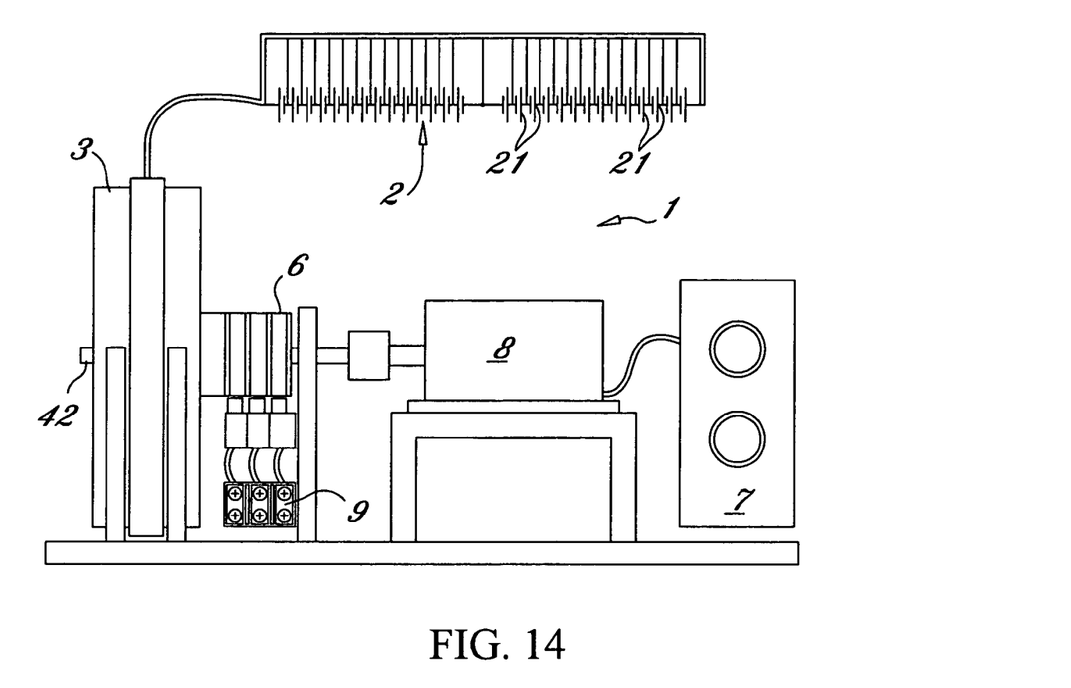
FIG. 14 is a diagrammatic left side view of a setup using the rotary switch shown in FIG. 13.
Figure 15:
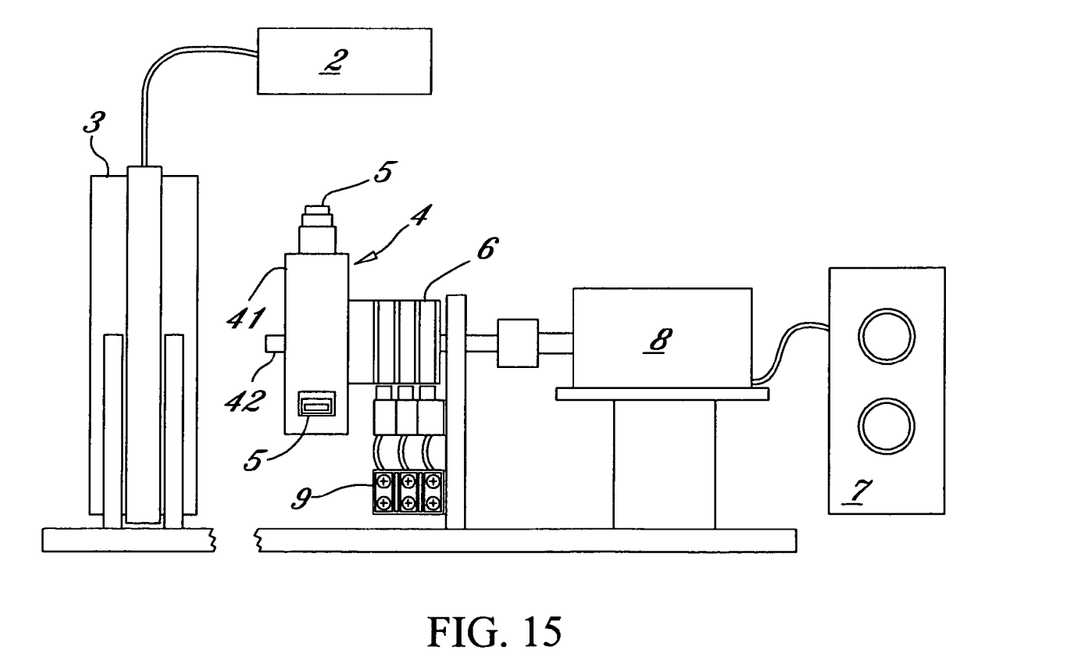
FIG. 15 is an exploded left side view of the setup shown in FIG. 14 with the stator and commutator separated from the rotor.
Figure 16:
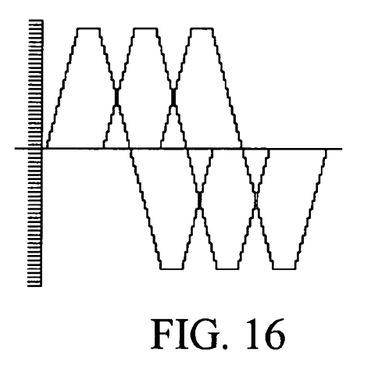
FIG. 16 is a three-phase waveform produced by the setup according to FIG. 14.

FIG. 14 shows a setup 1 for producing a three-phase waveform as shown in FIG. 16. The setup includes a battery power supply 2. For illustrative purposes, the battery power supply 2 is shown as a plurality of cells 21 connected in series. The battery power supply 2 is connected to a stator and commutator 3. As shown in FIG. 15, a rotor 4 with three brushes 5 turns within the stator and commutator 3. The three brushes 5 each pick up a sine-shaped voltage waveform. The combined waveform is therefore a three-phase waveform. Each phase is conducted from one of the brushes to a respective slip ring 6. From the slip rings 6, the current is transferred to the output 9. To initiate the turning of the rotor 4, a starter 7 and motor 8 are connected mechanically to the axel 42 of the rotor 4.

Figure 1:
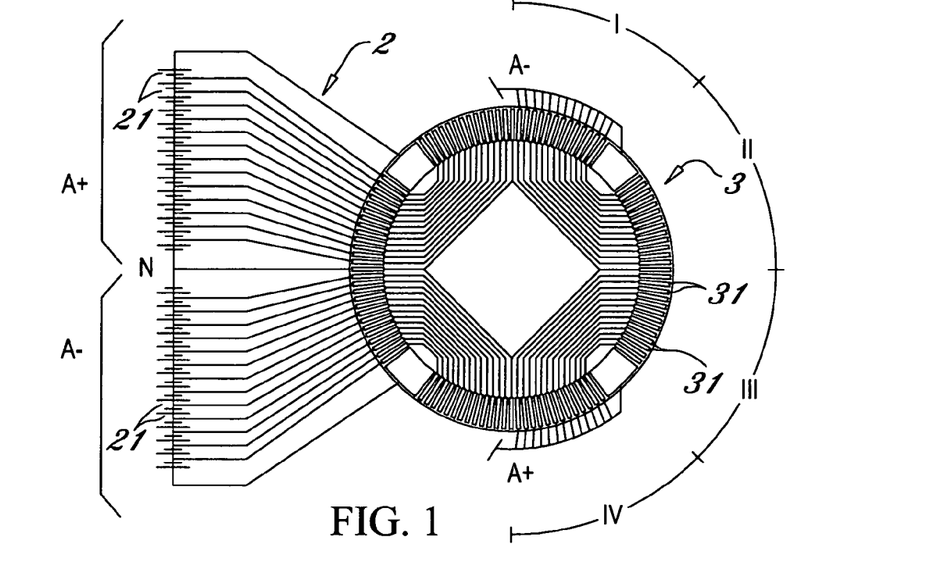
FIG. 1 is a schematic front view showing a stator and commutator with internal connections and a battery for producing two periods per rotation according to the invention.
Figure 2:
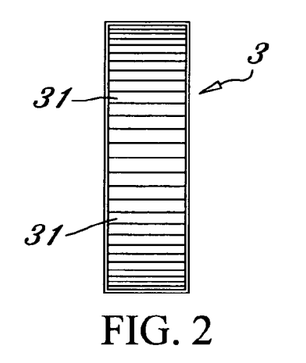
FIG. 2 is a diagrammatic cutaway side view showing an internal surface of the stator and commutator shown in FIG. 1.
Figure 21:
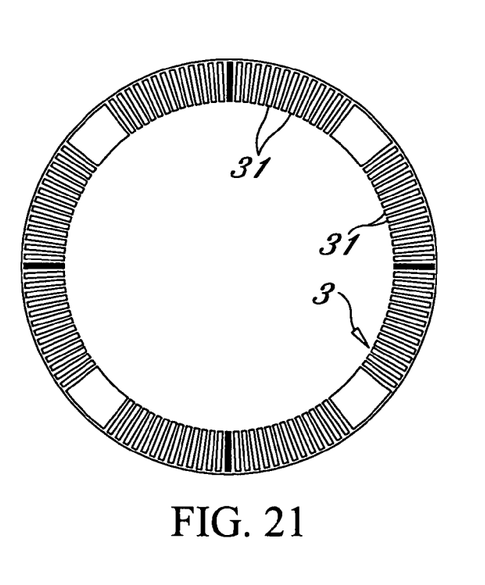
FIG. 21 is a front view of the stator and commutator shown in FIG. 1, without the internal connections.
Figure 22:
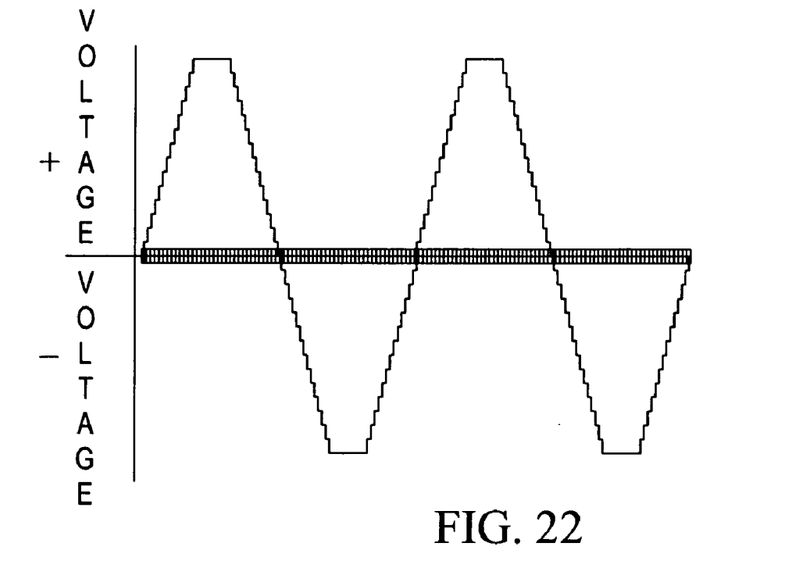
FIG. 22 is graph plotting the voltage versus the perimeter of the stator and commutator shown in FIG. 21.

FIGS. 1, 2, and 21 show the battery 2 and the stator and commutator 3 in detail. The battery 2 is formed by a plurality of cells 21 connected in series. The series connection provides different voltage levels at the taps where each cell is connected to the next. A neutral point N is defined at the midpoint of the battery 2. As noted in FIG. 1, one side of the battery has a voltage in a first direction A+ and the other side has a voltage in an opposite direction A−. The stator and commutator 3 is a wheel made from conductive segments 31 that are electrically insulated from each other. Preferably, the segments 31 are made from copper. An insulative ring surrounds the outside of the stator and commutator and supports the segments 31. Preferably, the number of cells 21 is a whole number ratio (i.e. . . . 3:1, 2:1, 1:1, 1:2, 1:3 . . . ) to the number of segments 31. In a most preferred embodiment, the number of segments 31 is twice the number of cells 21. The battery power segments 31 are connected in the sequence of the cells 21. The result is stepped voltage approximating a sine wave as is shown in FIG. 22. The number of steps in the sine wave equals the number of segments 31 in the stator and commutator 3. Therefore, the more segments 31 that are present, the more perfectly the stepwise approximation will approach a sine wave. The ground for the sine wave is connected to the neutral point N of the battery 2.

Figure 3:
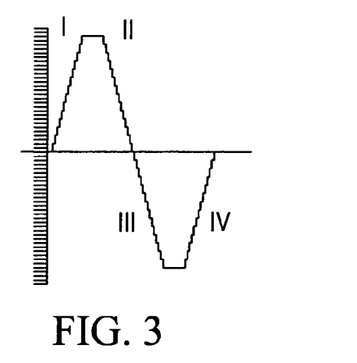
FIG. 3 is a waveform showing a single-phase output produced by half of a turn around the stator and commutator shown in FIG. 1.
Figure 4:
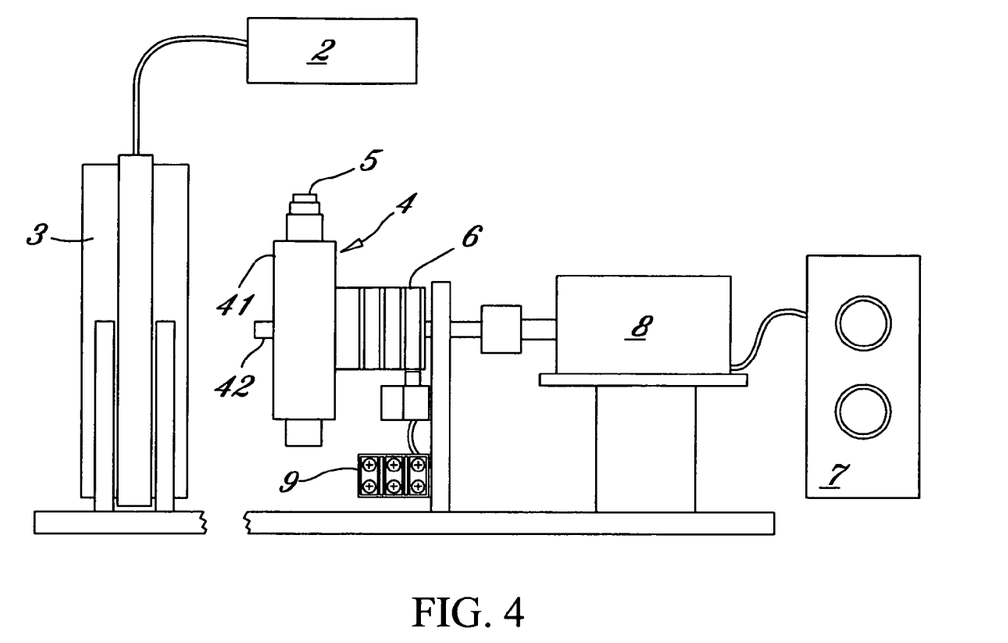
FIG. 4 is an exploded diagrammatic view of a setup having one brush on the rotor.
Figure 5:
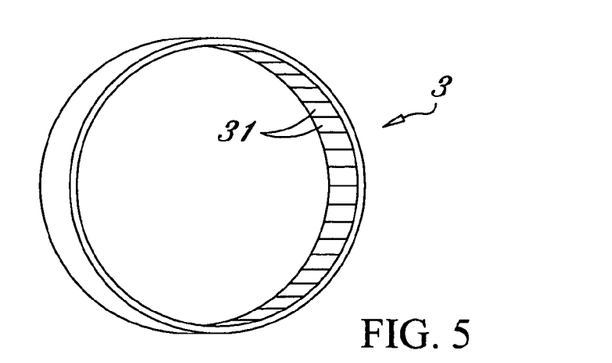
FIG. 5 is a diagrammatic front perspective view showing the stator and commutator from FIG. 1.
Figure 6:
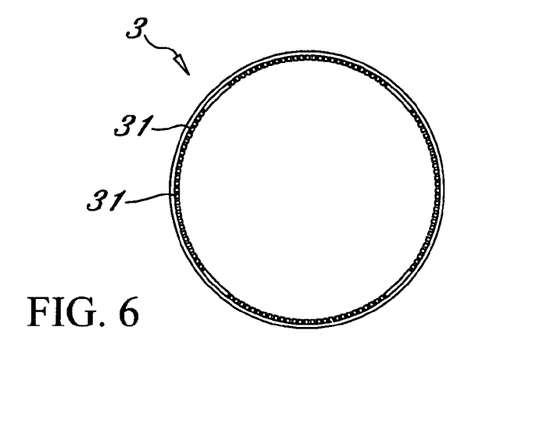
FIG. 6 is a diagrammatic front view of the stator and commutator shown in FIG. 3.
Figure 7:
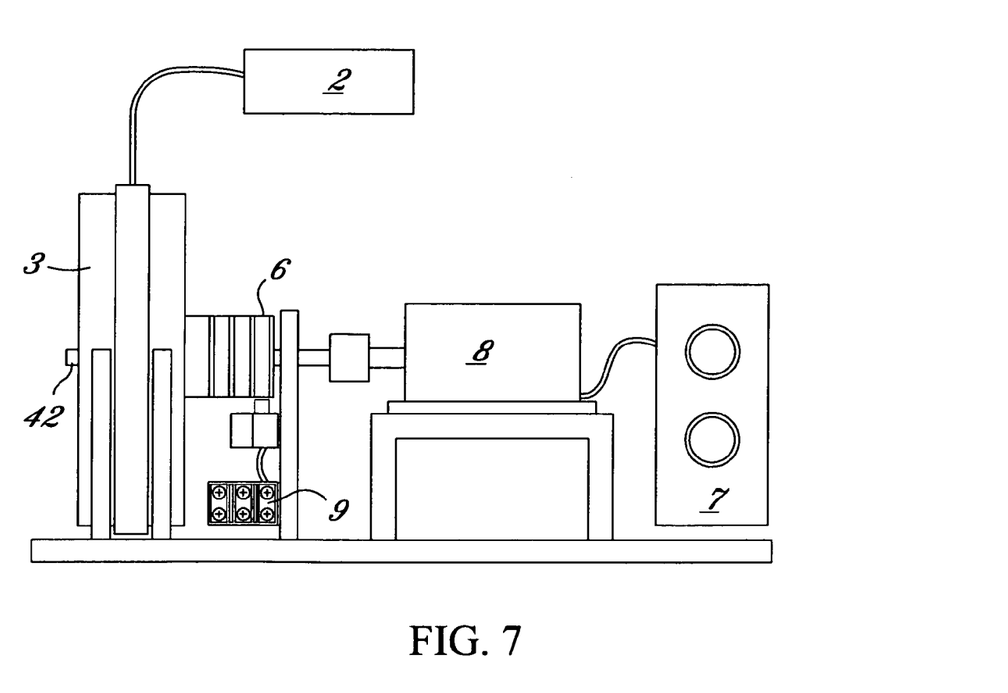
FIG. 7 is a front view of the setup shown in FIG. 4.
Figure 8:
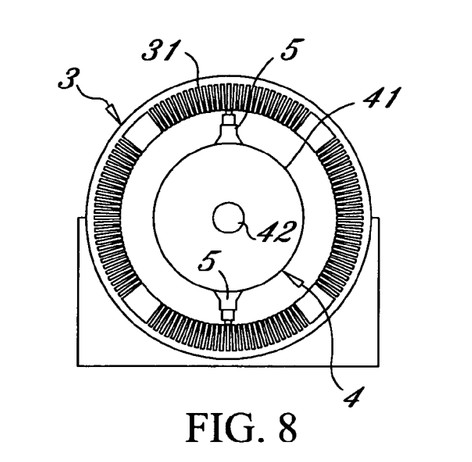
FIG. 8 is a front view of a rotary switch utilizing a rotor with two brushes.
Figure 9:
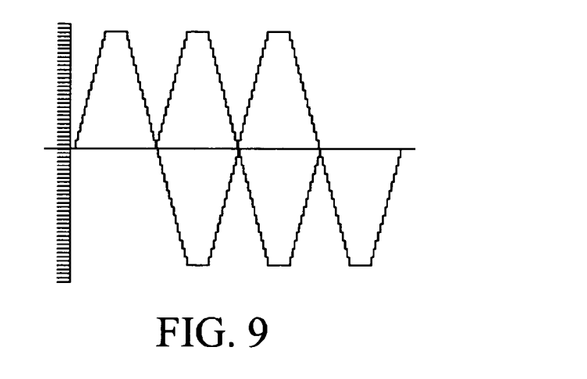
FIG. 9 is a waveform showing the two-phase output produced by the setup shown in FIG. 10.
Figure 10:
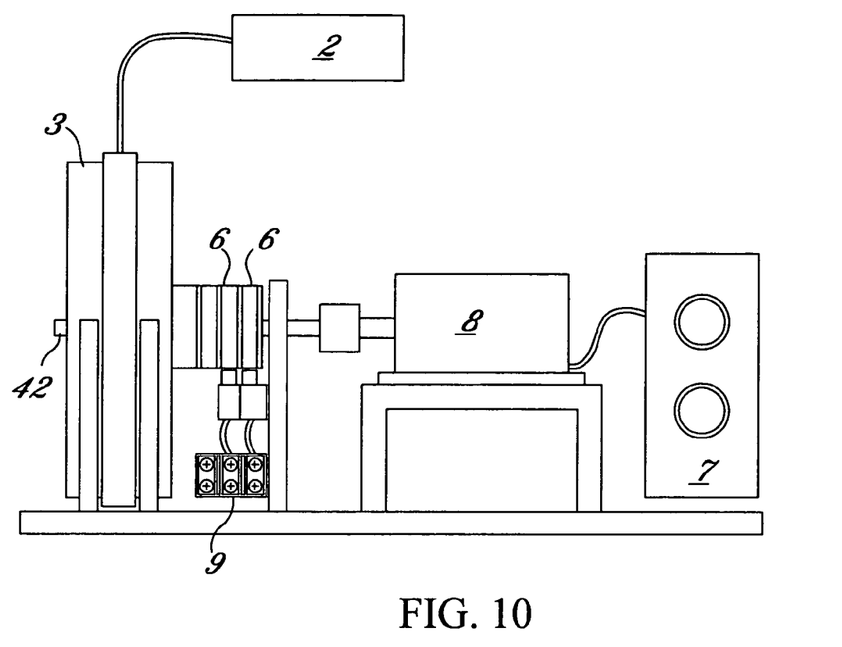
FIG. 10 is a left side view showing a setup having a rotor with two brushes.
Figure 11:
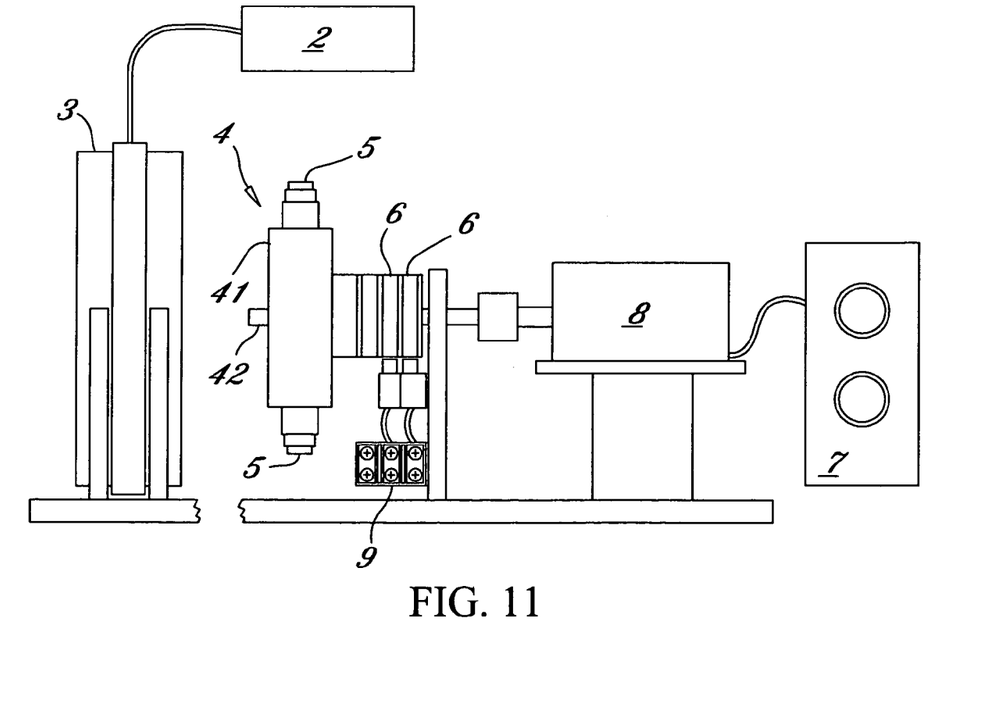
FIG. 11 is an exploded side view showing the setup from FIG. 10 with the rotor separated from the stator and commutator.

To reduce the necessary speed of the rotor to create a desired frequency, additional brushes 5 can be added to the rotor and the multiple of segments 31 can be increased. In the stator and commutator shown in FIG. 1, the multiple is two; that is, two complete phases are produced per turn of the rotor 4. As shown in FIG. 1, the segments 31 of the stator are connected to have an increasing positive voltage I, a decreasing positive voltage II, a decreasing negative voltage III, and an increasing voltage IV. These voltages can be plotted to the waveform shown in FIG. 3.

The purpose of the stator and commutator 3 is to supply a sequence of increasing and then decreasing DC voltage to the brushes 5 of the rotor 4. As the brushes 5 rotate and contact the segments 31 in sequence, an increasing then decreasing voltage is created over time. The voltage when plotted versus time is a sine wave.

Figure 13:
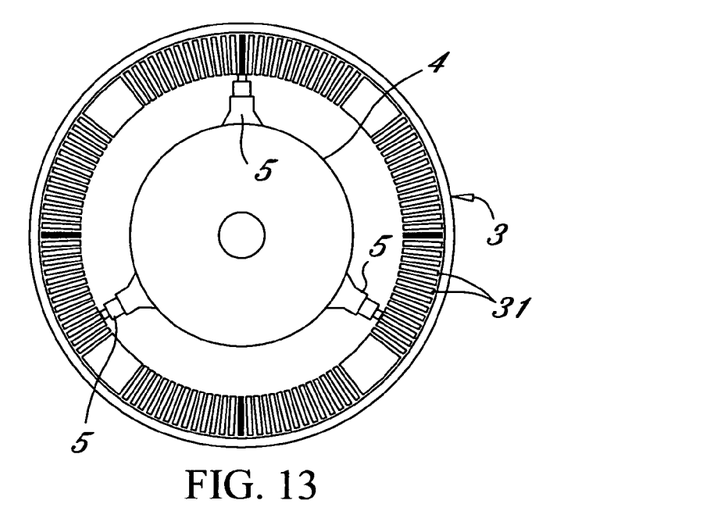
FIG. 13 is a front view showing a rotary switch having three brushes.

As shown in FIG. 13, the rotor 4 rotates concentrically within the stator and commutator 3.

FIGS. 3, 4, 7, and 12 show an embodiment where the rotor 4 has one brush 5. The brush 5 contacts the various segments 31 of the stator and commutator 3 as the rotor 4 turns. The rotor 4 rotates on a steel shaft 42. To start the rotor 4 turning, a starter 7 and a motor 8 are connected to the steel shaft 42. A counterbalance 51 is added to maintain a balanced rotation.

Figure 12:
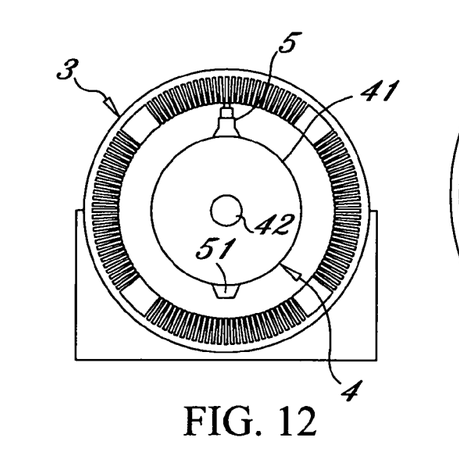
FIG. 12 is a front view of a rotary switch having a rotor with one brush and a counterbalance.

In a preferred embodiment, the rotor 3 is a solid wheel 41 that rotates on a steel shaft 42. An electric motor 8 with a starter 7 is included to start the rotor 3 turning. A slip ring 6 is connected to the brush 5. In turn, the slip ring 6 is connected to the output 9.

FIGS. 8, 9, 10, and 11 show an embodiment where the rotor 4 has two (2) brushes 5. Preferably, the brushes 5 are spread evenly about the perimeter of the rotor 4. By spreading the brushes 5 evenly, the dual waveform shown in FIG. 9 can be produced. The brushes 5 contact the various segments 31 of the stator and commutator 3 as the rotor 4 turns. The rotor 4 rotates on a steel shaft 42. To start the rotor 4 turning, a starter 7 and a motor 8 are connected to the steel shaft 42. In a preferred embodiment, the rotor 3 is a solid wheel 41 that rotates on a steel shaft 42. An electric motor 8 with a starter 7 is included to start the rotor 3 turning. Each brush S is connected to a respective slip ring 6 and the waveform is carried to the slip ring 6. Likewise, the slip ring 6 is connected to the output 9.

Figure 17:
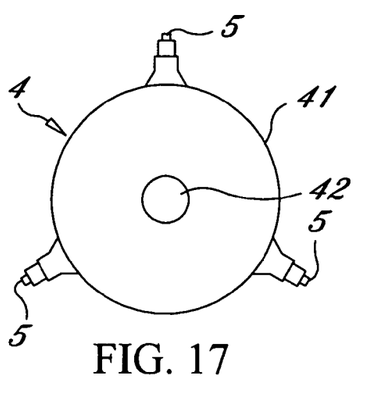
FIG. 17 is a front view of the rotor used in the setup shown in FIG. 14.

In the embodiment shown in FIG. 17, three brushes 5 are distributed about the perimeter of the wheel 32. To distribute the phases to be created, the brushes 5 are spaced equidistantly about the wheel 32. As each of the brushes 5 rotates against the stator and commutator 3, a sine wave is created. The frequencies of the three resultant waveforms are equally out of phase with each other by one-third of a period. The three waveforms are shown in FIG. 16.

Figure 18:
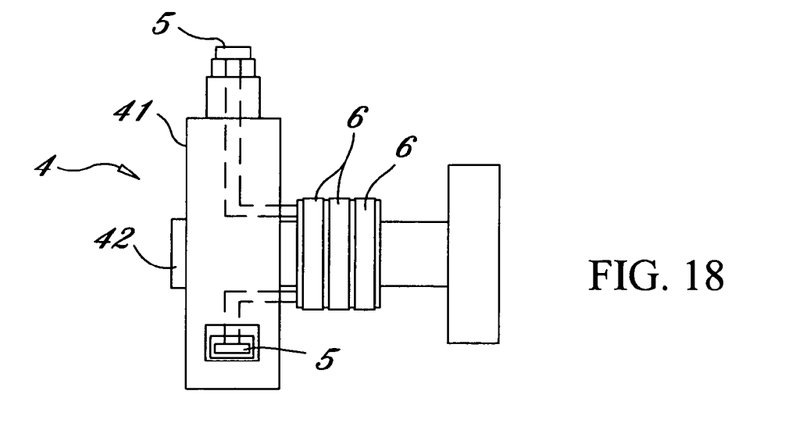
FIG. 18 is a left-side view of the rotor used in the setup shown in FIG. 14 with the connections from the brushes to the slip rings shown in phantom.

As shown in FIG. 18, the shaft 33 has three slip rings 6. A current from each of the brushes 5 is carried to a respective slip ring 6. From the sling ring, the current is connected to the output 9, where it can be used to power any typical device.

Figure 19:
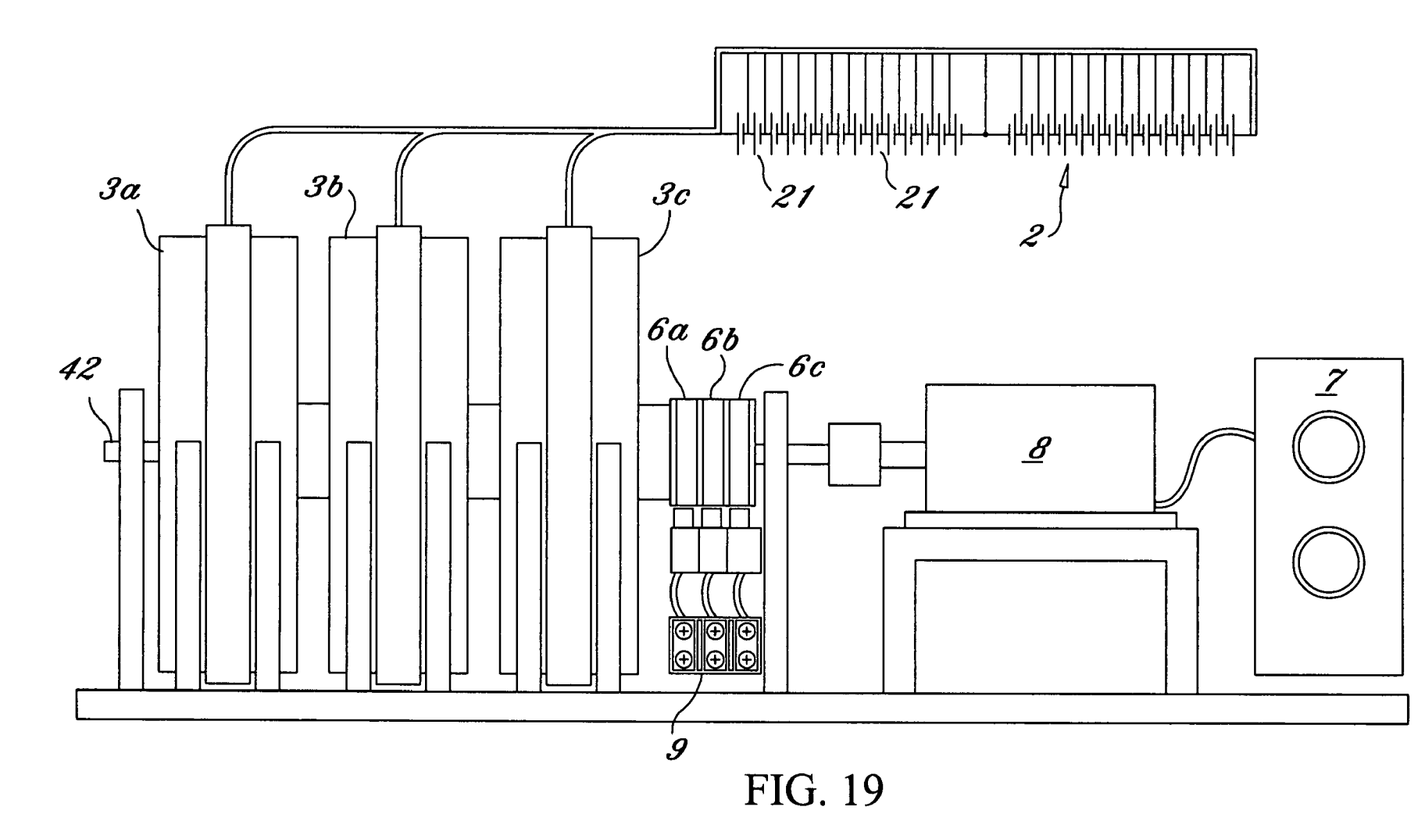
FIG. 19 is a left side view of a setup utilizing three stator and commutator/rotor pairs.
Figure 20:
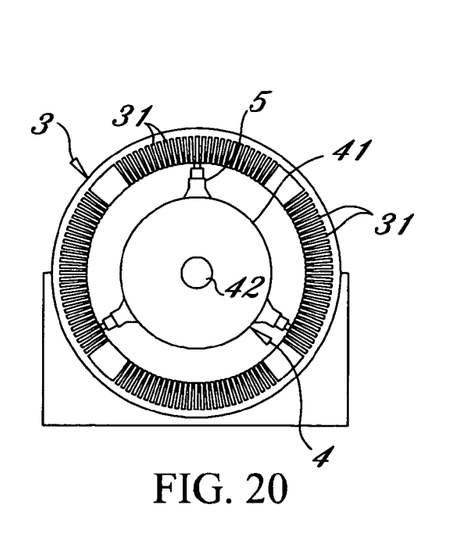
FIG. 20 is a front side view of one of the pairs of the stator and commutator and rotor shown in FIG. 19.

FIG. 19 shows an embodiment that produces increased power. In this embodiment, the battery 2 is as described above. Three stators and commutators 3a, 3b, and 3c are connected in parallel to the battery 2. Respective rotors 4a, 4b, and 4c (hidden in the view of FIG. 19) rotate on a common axis 42. The rotors 4a, 4b, and 4c could include one, two, or three brushes 5. In the embodiment shown in FIG. 20 includes three brushes 5. Each of the brushes 5 of each of the rotors 4a, 4b, and 4c are connected to a respective slip ring 6a, 6b, or 6c. The slip rings 6a, 6b, and 6c, are connected to output 9.

Preferably, the electric motor 7 is a direct current power unit with rpm control in order to maintain the same rpm. The motor 7 has a light load. The purpose of the motor 7 is to turn the rotor(s) 4 in the stator and commutator 3. The rpm (revolution per minute) of the motor 7 determines the frequency of the output signal according to the following equation:

$$RPM = \frac{(60 \text{ sec/min})(\text{frequency})}{(\text{multiple})}$$

Where "multiple" is the multiple of cycles per revolution and "frequency" is the desired frequency, typically 60 Hz.

Figure 23:
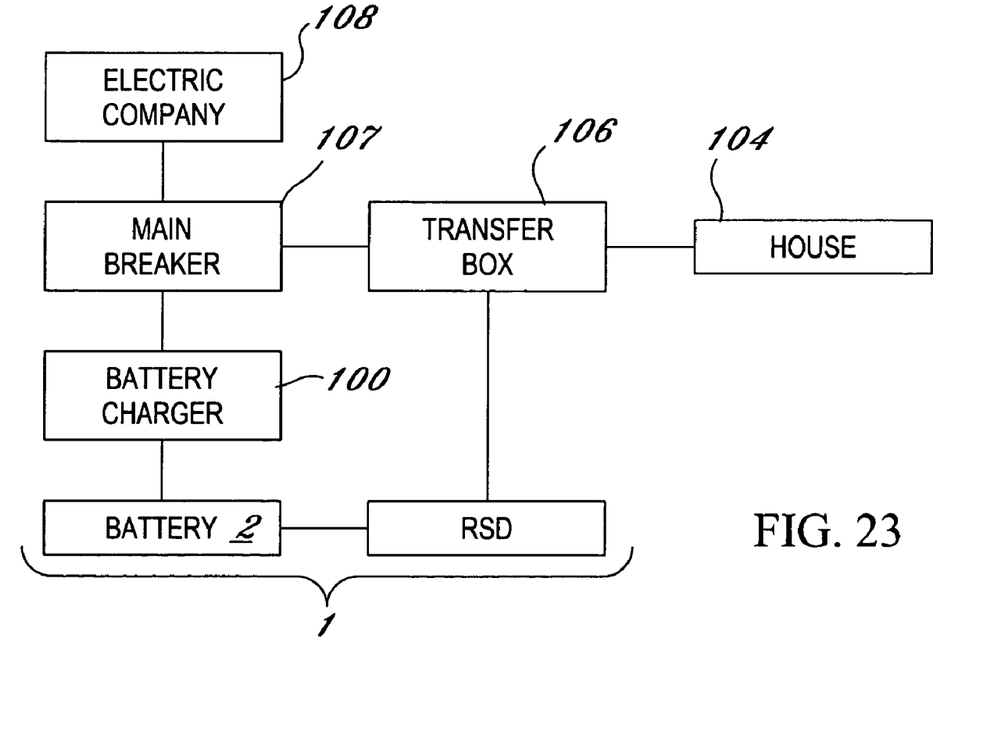
FIG. 23 is a block diagram of an emergency generator utilizing the rotary switching device according to the invention.

FIG. 23 shows a setup 1 being utilized as a back-up generator for a house 104 receiving alternating current under normal conditions from an electric company 108. Normally, current from the electrical company 108 reaches a main breaker 107 that is connected to a transfer box 106 of the house 104. During normal operation, electricity from the electric company 108 recharges the battery 2 via the battery charger 100. In alternate embodiment, the battery charger 100 can be an internal combustion motor connected to an alternator. As described above, the battery 2 powers the rotary switching device (RSD) of the setup 1 and outputs power to the transfer box 106. If power from the electric company is interrupted, the setup 1 feeds alternating current for the house 104 via the transfer box 106.

Figure 24:
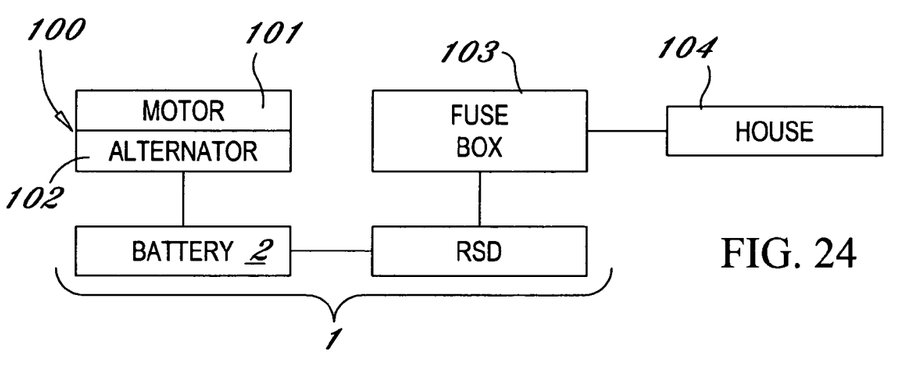
FIG. 24 is a block diagram of an AC generator recharged by an alternator.

FIG. 24 shows the connections used to apply the setup 1 in a typical power generator. In this case, a battery charger 100 is formed simply by a motor 101 connected to an alternator 102. In turn, the alternator 102 is connected to and charges the battery 2. The setup 1 is connected to the fuse box 103 of the user (i.e. house or business). The fuse box 103 distributes electricity throughout the house 104.

Figure 25:
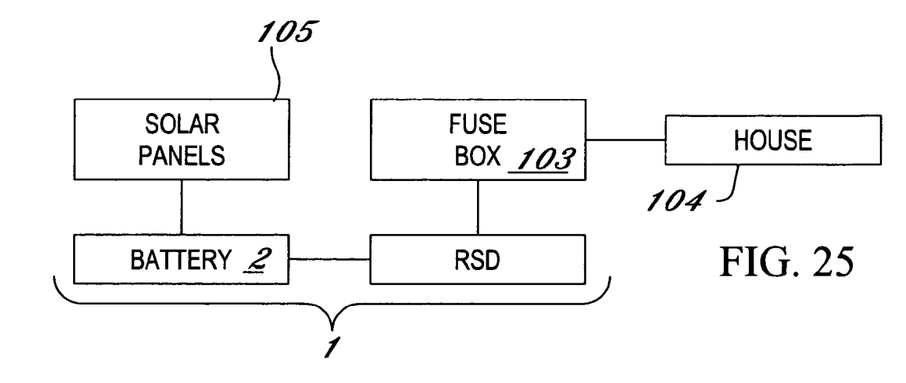
FIG. 25 is a block diagram of a generator recharged by a solar panel.

FIG. 25 shows the setup 1 being used with solar panels 105. Solar panels 105 are connected to the battery 2 and provide direct current to the battery 2 for charging. As before, the setup 1 is connected to the fuse box 103 where electricity is distributed to the house 104.

I claim:

1. An apparatus for generating sine waves of electromotive force, comprising:
   a battery including a given number of cells connected in series;
   a stator and commutator formed by a multiple of segments, the multiple equaling said given number of cells multiplied by a natural number;
   each of said segments being connected sequentially to a respective one of said cells wherein each of said segments comprise a plurality of windings, wherein each of said plurality of windings are connected to each of said cells according to a predetermined configuration to cause a different voltage and polarity from the battery to be imparted on the said plurality of windings.

2. The apparatus according to claim 1, wherein said natural number is at least two and said segments are in order of ascending positive voltages, descending positive voltages, descending negative voltages, and increasing negative voltages.

3. The apparatus according to claim 1, further comprising:
   a rotor having a brush, wherein said rotor is configured to rotate concentrically within said commutator with said brush contacting said segments.

4. The apparatus according to claim 1, further comprising:
   a rotor turning concentrically within said commutator; and a plurality of brushes disposed on said rotor, wherein said plurality of brushes are configured to contact said segments.

5. The apparatus of claim 4, wherein said plurality of brushes equals a number of desired phases.

6. The apparatus of claim 4, wherein said brushes are evenly distributed about said rotor.

7. The apparatus of claim 4, further comprising a counterbalance disposed on said rotor opposite said brush.

8. The apparatus of claim 4, further comprising a slip ring on said axis connected to said brush.

9. The apparatus of claim 6, further comprising a number of slip rings equaling said number of brushes, each one of said slip rings being connected to a respective one of said brushes.

10. The apparatus of claim 4, further comprising:
    an electric motor connected to said axis of said rotor; and
    a starter connected to said electric motor.

11. A rotary switch, comprising:
    a battery including a given number of cells connected in series;
    a plurality of stators and commutators each formed by a multiple of segments, said multiple equaling said given number of cells multiplied by a natural number, each of said segments being connected sequentially to a respective one of said cells, and said stators and commutators being connected in parallel to said battery, wherein each of said segments comprise a plurality of windings, wherein each of said plurality of windings are connected to each of said cells according to a predetermined configuration to cause a different voltage and polarity from the battery to be imparted on the said plurality of windings; and
    a respective rotor for each of said stators and commutators, each having a brush and turning concentrically within said commutator with said brush contacting said segments.

12. The rotary switch according to claim 11, wherein said rotors are coaxial.

13. In a house using alternating current and having a transfer box connected to a main breaker of an electric utility, a generator, comprising:
    a battery including a given number of cells connected in series;
    a stator and commutator formed by a multiple of segments, the multiple equaling said given number of cells multiplied by a natural number, wherein each of said segments are connected sequentially to a respective one of said cells, wherein each of said segments comprise a plurality of windings, wherein each of said plurality of windings are connected to each of said cells according to a predetermined configuration to cause a different voltage and polarity from the battery to be imparted on the said plurality of windings;
    a rotor having a brush, wherein said rotor is configured to rotate concentrically within said commutator with said brush contacting said segments;
    a battery charger interconnecting the main breaker to said battery and configured to convert alternating current from the electric utility to direct current for charging said battery; and
    an output connected to the transfer box.

14. In a house using alternating current and having a fuse box; a generator, comprising:
    a battery including a given number of cells connected in series;
    a stator and commutator formed by a multiple of segments, the multiple equaling said given number of cells multiplied by a natural number, wherein each of said segments are connected sequentially to a respective one of said cells;
    a rotor having a brush, wherein said rotor is configured to rotate concentrically within said commutator with said brush contacting said segments;
    a battery charger connected to said battery and configured to provide direct current for charging said battery; and
    an output connected to the fuse box.

15. The generator according to claim 14, wherein said battery charger includes an alternator and a motor turning said alternator.

16. The generator according to claim 14, wherein said battery charger includes a solar panel.

* * * * *